(12) United States Patent
Schauder et al.

(10) Patent No.: US 7,015,283 B2
(45) Date of Patent: Mar. 21, 2006

(54) COMPOSITIONS OF POLYPROPYLENE AND POLYAMIDE

(75) Inventors: Jean-Roch Schauder, Wavre (BE); Guy Joseph Wouters, Brussels (BE); Sudhin Datta, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/962,312

(22) Filed: Oct. 8, 2004

(65) Prior Publication Data

US 2005/0107533 A1 May 19, 2005

Related U.S. Application Data

(60) Provisional application No. 60/510,666, filed on Oct. 10, 2003.

(51) Int. Cl.
*C08L 51/04* (2006.01)
*C08L 51/06* (2006.01)
*C08L 77/00* (2006.01)

(52) U.S. Cl. .......................................... 525/66; 525/179
(58) Field of Classification Search .................. 525/66, 525/179
See application file for complete search history.

(56) References Cited

U.S. PATENT DOCUMENTS

| 4,795,782 A | 1/1989 | Lutz et al. ..................... 525/66 |
| 5,006,601 A | 4/1991 | Lutz et al. ..................... 525/66 |
| 5,439,974 A | 8/1995 | Mattson ........................ 525/74 |
| 5,874,176 A | 2/1999 | Kamei et al. ............. 428/474.4 |

FOREIGN PATENT DOCUMENTS

| EP | 0 658 640 | 6/1995 |
| GB | 2 226 035 | 6/1990 |
| JP | 60134013 | 7/1985 |
| JP | 3252436 | 11/1991 |
| JP | 04089853 | 3/1992 |
| JP | 06-100775 | * 4/1994 |
| JP | 06-234896 | * 8/1994 |
| JP | 09059438 | 3/1997 |
| WO | WO 99/65982 | 12/1999 |
| WO | WO 00/01766 | 1/2000 |
| WO | WO 02/36651 | 5/2002 |

OTHER PUBLICATIONS

S. B. Brown, "Reactive Extrusion: A Survey of Chemical Reactions of Monomers and Polymers during Extrusion Processing" Chapter 4, pp. 75-199, Hanser Publishers, New York, (1992).
Abstract for EP 0 658 640, Jun. 21, 1995 (see line AD).
"The Role of Core/Shell-Microparticle Dispersions in Polypropylene/Polyamide-6 Blends", Rösch et al., Polymer Bulletin 32, 697-704 (1994), Germany.
"Toughened Polypropylene-Polyamide 6 Blends Prepared by Reactive Blending", J. Rösch et al., Adv. Chem. Ser. (1996), 252 (Toughened Plastics II), 291-302, Germany.
"Impact-Modified Nylon 6/Polypropylene Blends: 2. Effect of Reactive Functionality on Morphology and Mechanical Properties", González-Montiel et al., Polymer vol. 36, No. 24, pp. 4605-4620, (1995), Austin.
"Impact-Modified Nylon 6/Polypropylene Blends: 3. Deformation Mechanisms", González-Montiel et al., Polymer vol. 36, No. 24, pp. 4621-4637, (1995), Austin.
Abstract for JP09059438, Mar. 4, 1997 (see line AE).
Abstract for JP04089853, Mar. 24, 1992 (see line AF).
Abstract for JP60134013, Jul. 17, 1985 (see line AG).
Gonzalez-Montiel et al., "Impact-modified Nylon 6/polypropylene Blends: I. Morphology-Property Relationships" *Polymer*, vol. 36, No. 24, pp. 4587-4603, (1995).

* cited by examiner

*Primary Examiner*—Ana Woodward
(74) *Attorney, Agent, or Firm*—Leandro Arechederra

(57) ABSTRACT

The invention relates to thermoplastic compositions in which (A) an isotactic polypropylene, optionally containing comonomer, with a melting point of at least 110° C. and (B) a polyamide, (A) and (B) constituting at least 70 wt %, are blended with (C) at least 2 wt % of a grafted functionalized propylene-based elastomer having isotactic crystallinity and containing at least 0.25 wt % of MAH-derived units based on the total weight of (C). Optionally (D) an ungrafted polyolefin may be added with a melting point of less than 100° C., (C) and (D) combined being at least 8 wt % and the wt % of (A), (B), (C) and (D) being calculated on the basis of the total polymer weight of the thermoplastic composition.

64 Claims, 2 Drawing Sheets

COMPOSITIONS OF POLYPROPYLENE AND POLYAMIDE

This application claims the benefit of U.S. Provisional Application No. 60/510,666, filed Oct. 10, 2003, the entire disclosure of which is hereby incorporated herein by reference.

FIELD OF INVENTION

The invention relates to compositions of polypropylene and polyamide for use in, for example, molded articles for automotive applications.

BACKGROUND OF INVENTION

The grafting of polyolefins consisting largely of polypropylene with polar chemical modifiers, such as maleic anhydride (MAH) and acrylic acid is known. The grafting reaction can be performed in solution, in gas phase, or by surface modification. However, the most common grafting process is performed during melt processing, for example in single or multiple screw extruders, rubber masticators, Banbury mixers, Brabender mixers, roll-mills and the like. Such procedures are well-known and described in the technical literature. The grafting of polypropylene with unsaturated monomers including maleic anhydride is described, for example, in S. B Brown, Reactive Extrusion, Chapter 4, published by Polymer Processing Institute (1992). U.S. Pat. No. 5,439,974 addresses adhesive blends suitable for adhesion to one or more polypropylene substrates consisting essentially of a mixture of an impact copolymer and a graft reaction product of a propylene polymer and a carboxylic acid or a derivative thereof. The polymeric backbone, which is grafted, is an impact copolymer, defined as a mixture of polypropylene and ethylene/propylene copolymer.

WO02/36651, the disclosure of which is hereby incorporated herein by reference, describes methods for grafting propylenic elastomers, also referred to herein as propylene-ethylene copolymers. WO02/36651 discloses grafting of propylene ethylene copolymers having a low ethylene content (between 8 and 32 mole %), and with predominantly isotactic polypropylene segments (>80% mm triad by $^{13}C$ NMR), giving polypropylene type crystallinity, with MAH. These polymers, comprising low levels of ethylene content, permit higher levels of grafting.

Polyolefins, which have polar groups due to such grafting reactions, are used in blends with engineering thermoplastics. These may have a polyamide (PA) matrix and a dispersed phase formed by the grafted polyolefin, which acts as the impact modifier (IM) so as to reduce brittle failure. The IM may also include a non-grafted EP rubber (EP) or a low-density amorphous or semi-crystalline polyolefin (VLDPE). Certain publications suggest the use of an ungrafted propylenic elastomer as impact modifier. See, for example, WO99/65982 and WO2000/01766. In such a case, the grafted polyolefin acts to compatibilize the PA and the ungrafted IM. A three-component blend of PA, ungrafted polyolefin and MAH-grafted ethylene propylene rubber results.

Impact modification is also used where the matrix polymer is polypropylene having a high degree of crystallinity as generally indicated by melting point of over 100° C. The polypropylene matrix polymer has different properties from the polyamide matrix polymer, which is reflected in the heat resistance and strength and reduced moisture sensitivity. Blends of polypropylene and polyamide have hence been employed with an additional impact modifier to obtain a desirable overall balance of cost and performance. Stiffness can be improved by incorporating the polyamide as a dispersed phase in a polypropylene matrix continuous phase. The cost of the composition can be reduced at marginal loss of performance by incorporating polypropylene as a dispersed phase in a PA matrix continuous phase.

The manner in which the different phases are intermingled has influence on the overall cost performance balance. MAE grafted polypropylene has been used to improve performance of polypropylene-polyamide alloys. EP- 658640 discloses a three-component blend of polypropylene, PA and MAH-grafted polypropylene.

WO02/36651, beginning on page 12 line 8, discusses blends of the grafted propylene based elastomers with other alpha-olefin polymers and copolymers, e.g., polypropylene for fabrication into objects used in a variety of applications. Beginning on page 26 line 1, WO02/36651 discusses use as compatibilizers of polyamide-polypropylene blends to increase the percent of elongation at break point. A composition comprising polypropylene, a polyamide, and a MAH-grafted propylene based elastomer would result.

U.S. Pat. No. 4,795,782 discloses three component blends of PA, MAH-grafted polypropylene and MAH-grafted styrene-butadiene-styrene tri-block copolymers. Polymer Vol. 36 pages 4587–4603, 1995 discloses three-component blends of PA, polypropylene and MAH-grafted EP rubber. Run 12 in Table 1 of GB2226035 discloses blends of PA, polypropylene, EP copolymer and MAH-grafted propylene based Impact Copolymer. JP-03252436 discloses the use of compositions of polypropylene, PA, EP copolymer and MAH-grafted polypropylene.

Embodiments of the present invention may have one or more advantages over previously known materials, such as providing compositions containing both PA and polypropylene with improved cost performance balance and improved balance of impact strength and stiffness. In some embodiments, the impact strength may be significantly improved without substantive reduction of stiffness, particularly for compositions having a relatively low stiffness.

SUMMARY OF INVENTION

In one embodiment, the invention provides a thermoplastic composition comprising isotactic polypropylene with a melting point of at least 110° C., a polyamide, a grafted functionalized propylene-based elastomer having isotactic crystallinity, and optionally an ungrafted polyolefin having a melting point of less than 100° C. The grafted functionalized propylene-based elastomer contains at least 0.25% by weight, based on the total weight of the elastomer, of MAE-derived units. The combined weight percent of the isotactic polypropylene and the polyamide is at least 70%, based on the total polymer weight of the composition. The combined weight percent of the grafted functionalized propylene-based elastomer and optional ungrafted polyolefin is at least 8%, based on the total polymer weight of the composition.

In another embodiment, the polypropylene provides the matrix into which the other components are dispersed, with the polypropylene comprising at least 60 wt % and the polyamide comprising at least 10 wt %. In a particular aspect of this embodiment, the composition may have a Flexural modulus within the range having a lower limit of 800 or 900 MPa and an upper limit of 1200 or 1600 MPa. In another particular aspect of this embodiment, the composition may have an improved impact resistance. For example, the composition may have a ratio [Izod Impact J/m²]/[Flexural Modulus in MPa] conforming to the relationship:

12<[Izod Impact J/m²]/[Flexural Modulus in MPa]
×1000<50; or

15<[Izod Impact J/m²]/[Flexural Modulus in MPa]
×1000<45.

In another embodiment, the polyamide forms the matrix or continuous phase, with the polyamide comprising at least 60 wt % and the polypropylene comprising at least 10 wt %. In a particular aspect of this embodiment, the composition may have a Flexural modulus within the range having a lower limit of 1200 or 1400 MPa and an upper limit of 1800 or 2000 MPa. In another particular aspect of this embodiment, the composition may have a ratio [Izod Impact J/m²]/[Flexural Modulus in MPa] conforming to the relationship:

14<[Izod Impact J/m²]/[Flexural Modulus in MPa]
×1000<80; or

18<[Izod Impact J/m²]/[Flexural Modulus in MPa]
×1000<60.

In another embodiment, substantially equivalent amounts of propylene and polyamide can be used.

In another embodiment, the dispersed phases can be arranged to have a small size, which may provide improved impact performance and PA derived reinforcement.

In another embodiment, the present invention provides a molded or extruded article made from any of the inventive compositions described herein.

In a particular aspect of any of the embodiments described herein, the composition has one or more of the following characteristics, in any combination:

a. the composition comprises at least 4% by weight of the propylene-based elastomer, based on the total polymer weight of the composition;

b. the combined weight percent of the propylene-based elastomer and optional ungrafted polyolefin is less than 30%, based on the total polymer weight of the composition;

c. the propylene-based elastomer has crystallinity derived from stereoregularly arranged propylene units;

d. the propylene-based elastomer has crystallinity derived from isotactically arranged propylene units;

e. the propylene-based elastomer has a heat of fusion of less than 40 J/g;

f. the propylene-based elastomer has a melting point of less than 110° C.;

g. the propylene-based elastomer contains MAE-derived units in an amount within the range having a lower limit of 0.1%, or 0.5% by weight and an upper limit of 1.5%, or 2% by weight, based on the total weight of the elastomer;

h. the propylene-based elastomer contains ethylene-derived units in an amount within the range having a lower limit of 5 mol %, or 12.5 mol % and an upper limit of 25 mol %, or 40 mol %;

i. the propylene-based elastomer has a heat of fusion of from 5 to 30 J/g, which reflects the elastomeric nature of the polymer;

j. the ungrafted polyolefin is an ethylene alpha-olefin copolymer;

k. the ungrafted polyolefin is an ethylene propylene copolymer;

l. the ungrafted polyolefin has a density of from 0.85 to 0.89 g/cc;

m. the ungrafted polyolefin has an ethylene content of from 45 to 65 wt %;

n. the ungrafted polyolefin is used in an amount of from 60% to 20% by weight, based on the total combined weight of the propylene-based elastomer and the ungrafted polyolefin;

o. the ungrafted polyolefin is also a propylene-based elastomer having isotactic crystallinity and containing a comonomer in an amount within 10 mol % of the amount of comonomer present in the grafted functionalized propylene-based elastomer;

p. the comonomer of the ungrafted polyolefin is ethylene;

q. the comonomer of the grafted functionalized propylene-based elastomer is ethylene;

r. the isotactic polypropylene is selected from the group consisting of a polypropylene homopolymer and a polypropylene random copolymer containing less than 10 wt % of crystallinity-disrupting comonomer; and s. the polyamide is selected from the group consisting of nylon 6, nylon 12, and nylon 6,6.

DETAILED DESCRIPTION

Grafted Propylene-Based Elastomer

Figure 1:
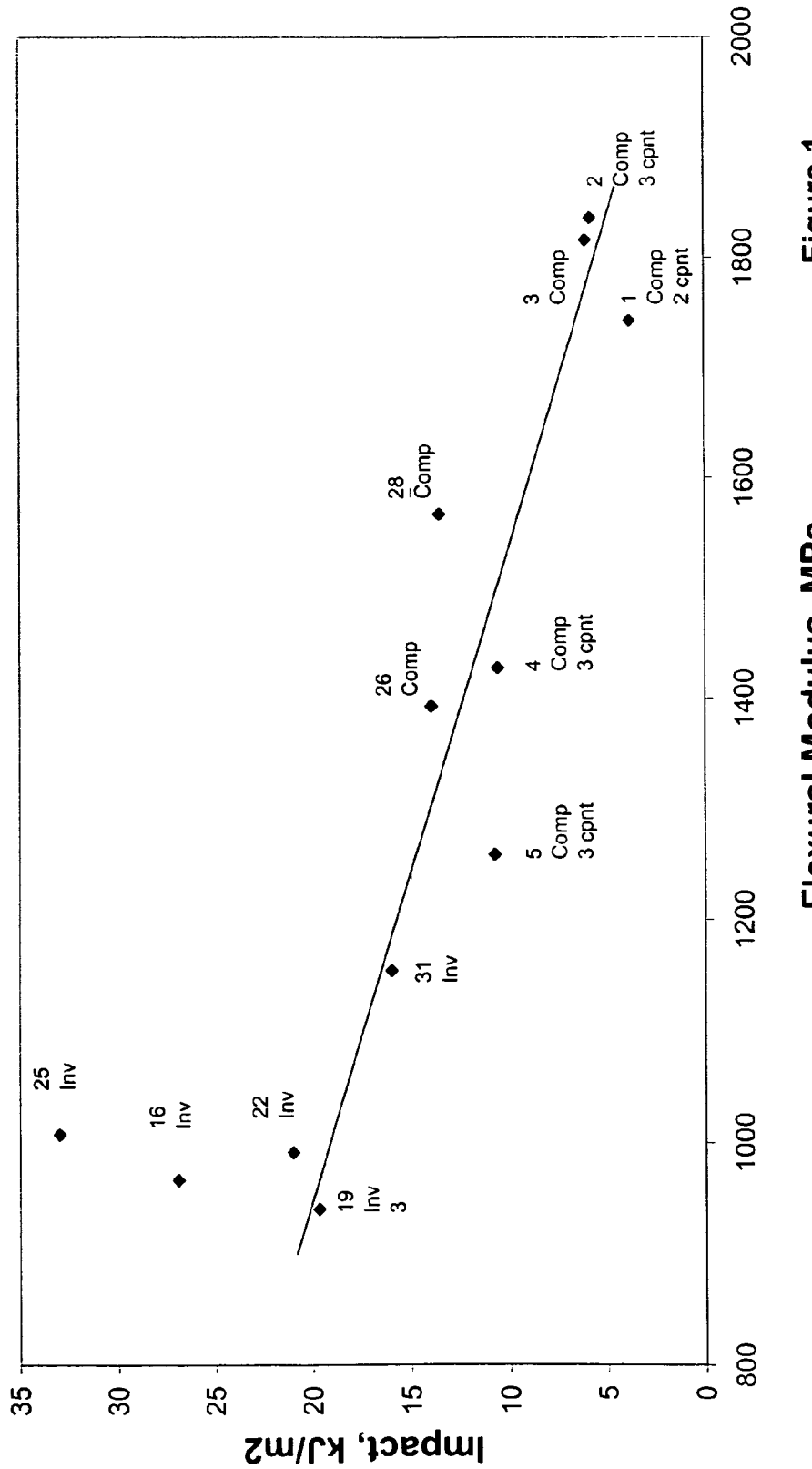
FIGS. 1 and 2 are graphs of the Izod impact strength and Flexural modulus of comparative and inventive compositions according to an embodiment of the invention.

The propylene-based semi-crystalline elastomers used in the compositions of the invention can be prepared by polymerizing propylene optionally with ethylene or higher alpha-olefins in the presence of a transition metal catalyst with an activator and optional scavenger. The crystallinity of the propylene-based elastomer arises predominantly from crystallizable stereoregular propylene sequences. Comonomers or propylene insertion errors separate these sequences. While syndiotactic configuration of the propylene is possible, polymers with isotactic configurations are preferred.

The transition metal catalyst may be a metallocene or a non-metallocene as disclosed in WO03/040201. The comonomer used with propylene may be linear or branched. Linear alpha-olefins include, but are not limited to ethylene, and $C_4$ to $C_{20}$ a-olefins such as 1-butene, 1-hexene, and 1-octene. Branched alpha-olefins include, but are not limited to 4-methyl-1-pentene, 3-methyl-1-pentene, and 3,5,5-trimethyl-1-hexene. The use of a chiral transition metal catalyst ensures that the methyl groups of the propylene residues have predominantly the same tacticity. For the polymers of the present invention the low levels of crystallinity in the propylene-based elastomers are derived from isotactic polypropylene obtained by incorporating alpha-olefin comonomers as described above. The propylene-based elastomer of the invention can have a heat of fusion within the range having an upper limit of 40, or 30, or 25, or 20, or 15 J/g and a lower limit of 0.5, or 1, or 5 J/g.

The crystallinity of the propylene-based elastomer can also be expressed in terms of crystallinity percentage. The thermal energy for the highest order of polypropylene is estimated at 189 J/g. That is, 100% crystallinity is equal to 189 J/g. Therefore, according to the aforementioned heat of fusion values, the propylene-based elastomer of the invention can have a polypropylene crystallinity within the range having an upper limit of 15%, or 13%, or 11% and a lower limit of 0.25%, or 0.5%. The propylene-based elastomer preferably has a single broad melting transition. Typically a sample of the polymer will show secondary melting peaks adjacent to the principal peak, which may be considered together as a single melting point. The highest of these peaks is considered the melting point (T max). The propylene-based elastomer of the invention can have a melting point within the range having an upper limit of 75° C., or 65° C., or 60° C. and a lower limit of 25° C., or 30° C. The weight average molecular weight of the propylene based elastomer can be within the range having an upper limit of 5,000,000 daltons, or 500,000 daltons and a lower limit of 10,000 daltons, or 80,000, with a MWD (Mw/Mn) within the range having an upper limit of 40.0, or 5, or 3 and a lower limit of 1.5, or 1.8. In some embodiments, the propylene-based elastomer can have a Mooney viscosity ML (1+4)@125° C. less than 100, or less than 75 or less than 60, or less than 30.

In one embodiment, the propylene-based elastomer of the invention comprises a random crystallizable copolymer having a narrow compositional distribution. The intermolecular composition distribution of the polymer is determined by thermal fractionation in a solvent. A typical solvent is a saturated hydrocarbon such as hexane or heptane. This thermal fractionation procedure is described in WO02/083753. Typically, approximately 75% or 85% by weight of the polymer is isolated as one or two adjacent, soluble fraction with the balance of the polymer in immediately preceding or succeeding fractions. Each of these fractions has a composition (wt. % ethylene content) with a difference of no greater than 20% (relative) and more preferably 10% (relative) of the average weight % ethylene content of the polypropylene copolymer. The propylene-based elastomer has a narrow compositional distribution if it meets the fractionation test criteria outlined above.

In one embodiment, the length and distribution of stereoregular propylene sequences in the propylene-based elastomers of the invention is consistent with substantially random statistical copolymerization. It is well known that sequence length and distribution are related to the copolymerization reactivity ratios. By substantially random, we mean copolymer for which the product of the reactivity ratios is generally 2 or less. In stereo-block structures, the average length of polypropylene sequences is greater than that of substantially random copolymers with a similar composition.

Prior art polymers with stereo-block structure have a distribution of polypropylene sequences consistent with these blocky structures rather than a random substantially statistical distribution. The reactivity ratios and sequence distribution of the polymer may be determined by $^{13}$C NMR, as is discussed in detail below, which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor, which allows only a single polymerization environment for substantially all of the polymer chains of the polypropylene copolymer.

The Grafting Options

The propylene-based elastomer may be grafted with grafting monomer, such as, but not limited to MAH, and ethylenically unsaturated carboxylic acid or acid derivative, such as an acid anhydride, ester, salt, amide, imide, and the like. Such monomers include, but are not limited to the following: acrylic acid, methacrylic acid, maleic acid, fumaric acid, itaconic acid, citraconic acid, mesaconic acid, crotonic acid, maleic anhydride, 4-methyl cyclohex4-ene-1,2-dicarboxylic acid anhydride, bicyclo(2.2.2)oct-5-ene-2,3-dicarboxylic acid anhydride, 1,2,3,4,5,&g, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norbom-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA). As used herein, the term "grafting" denotes covalent bonding of the grafting monomer to a polymer chain of the polymeric composition.

Generally the compatibilizing effect is influenced by the level of grafting. The propylene-based elastomer containing ethylene derived units may be grafted to a higher degree. The grafting level can be within the range having an upper limit of 2.0 wt %, or 1.5 wt % and a lower limit of 0.1 wt % or 0.3 wt %.

The Ungrafted Polyolefin

The ungrafted polyolefin of the invention can be any polymer used as impact modifier in the past and includes lower density materials often referred to as "plastomers" and materials referred to as "elastomers." For example, in one embodiment, the ungrafted polyolefin may be an impact modifier containing ethylene alpha-olefin copolymers. In a particular aspect of this embodiment, known types of ethylene alpha-olefin copolymers having a density of from 0.85 to 0.89 g/cc may be used, including, but not limited to ethylene butene, ethylene hexene, ethylene octene, and ethylene propylene copolymers. The ethylene propylene copolymers may have an ethylene content of, for example, 45 to 65 weight percent. The ethylene octene copolymers may have an ethylene content of, for example, 60 to 70 weight percent. In another particular aspect of this embodiment, the grafted propylene-based elastomer contains ethylene-derived units as discussed above, and the ungrafted polyolefin is an impact modifier containing ethylene and/or propylene derived units. The ungrafted polyolefin can also be a propylene based semi-crystalline polymer which may or may not employ the same comonomer type or the same level of the comonomer as the grafted propylene-based elastomer. The ungrafted polyolefin elastomers are generally used in an amount of from 60 to 20 wt % based on the total combined weight of the propylene-based elastomer and the ungrafted polyolefin.

Details of the Matrix Components

The isotactic polypropylene is generally selected from a polypropylene homopolymer, a polypropylene random copolymer containing less than 10 wt % of crystallinity disrupting comonomer, and an impact copolymer containing segments which are largely formed by propylene derived units and a more amorphous ethylene containing segment. Such polymers are well known and available commercially. The impact of the selection on the general properties of the composition as a whole can be predicted from the known physical properties of the polypropylene.

The polyamide is generally selected from any of the types described in Nylon Plastics Handbook, edited by Melvin I. Kohan, Hanser Publishers ISBN 1-56990-189-9. The polyamide may be, for example, nylon 6, nylon 12 or nylon 6,6.

Blending

The compositions of the invention can be prepared on apparatus and by methods well known in the manufacture of thermoplastic elastomers in general and polyolefins in particular. For example, batch methods can be used, as well as continuous mixing procedures. Extruders, such as twin screw extruders, are a non-limiting example of a continuous mixer. In a particular embodiment, a co-rotating twin screw extruder is used.

EXAMPLES

In the Examples below, the following ungrafted components were used:
PP is a propylene homopolymer sold by ExxonMobil Chemical as Escorene™ (Registered Trade Mark PP4352 which has an MFR at 230° C., 2.16 kg of 3 g/min.
NPP1 and NPP2 are propylene-based elastomers in the form of propylene ethylene copolymers.
PA-6 is Ultramid B3, a nylon 6 grade sold by BASF with an MVR (at 275° C., 5 kg) of 130 ml/10 min determined according to DIN1133.
EP is a narrow molecular weight distribution ethylene-propylene copolymer sold as Vistalon 785 by Exxon-Mobil Chemical having a Mooney (ML(1+4), 125° C. of 30 and an ethylene content of 49 wt %.
The grafted components were as follows:

TABLE 1

|  | MFR (230° C., 352 g) | MAH wt % | $C_2$ Content | Crystallinity/ Heat of Fusion |
|---|---|---|---|---|
| MAH grafted PP1 | 22 | 0.6 | 0 | 105 J/g |
| MAH grafted ICP | 1.6 | 1.04 | 9 | 88 J/g |
| MAH grafted NPP1 | 9 | 0.95 | 10.6 | 19 J/g |
| MAH grafted NPP2 | 7 | 0.96 | 15.2 | 4 J/g |
| MAH grafted EP | 3* | 0.7 | 50 | 0 J/g |

*MFR at 2.16 kg.

The feedstock included: PPI a polypropylene homopolymer; ICP a heterophasic impact copolymer made in series reactor with a fraction of predominantly propylene homopolymer and ethylene propylene copolymer as are available commercially; NPP1 and NPP2 propylene based elastomers in the form of propylene ethylene copolymers; and EP is an ethylene propylene elastomer.

The MAH-grafted polymers were prepared by reacting appropriate concentrations of MAH with the different polymeric feedstock. The polymers were melt functionalized on a non-intermeshing counter-rotating twin screw extruder under the following conditions: 97.5 weight % of the feedstock, 2.5 weight % of Crystalman MA, 0.4 wt % of a 10% solution of Luperox 130 under conditions similar to those in W98/07769, the disclosure of which is hereby incorporated herein by reference.

The various components mentioned in the Tables including the maleic anhydride material where appropriate were then blended with the PP and PA-6 (Ultramid B3 etc) in different proportions and combinations. The blending equipment is an intermeshing co-rotating twin screw extruder (34 mm, L/D=36) according to conditions similar to those in W98/07769. The blends were then tested as indicated in the Tables.

Some ungrafted materials used are given in Table 2.

TABLE 2

|  | MI Melt Index measured at 190° C., 2.16 Kg (ASTM 1238) | Density (g/cc) |
|---|---|---|
| EO1 | 1 | 0.882 |
| EO2 | 1 | 0.87 |
| EO3 | 0.5 | 0.868 |
| EO4 | 0.5 | 0.863 |
| EO5 | 1 | 0.857 |
| EO6 | 10 | 0.882 |
| EO7 | 30 | 0.87 |
| EO8 | 13 | 0.864 |
| EO9 | 30 | 0.882 |

All were ethylene octene copolymers made in a solution process using a metallocene based catalyst and NCA activator made by processes similar to those described in WO00/24792 and WO00/24793, the disclosures of which are hereby incorporated herein by reference.

The proportions and results were as set out in Tables 3, 4 and 5. In the Tables below, "F(max)" is the Force at maximum load in a stress strain curve which does not have a yield point, and "E-Mod." is the modulus of elasticity measured in a stress strain test and corresponds to the ratio of stress per unit of cross-sectional area to the corresponding strain for a strain from 0.005% to 0.25%.

TABLE 3

PP forms the matrix phase.
3 Component.
5 wt % Impact Modifier:

| Example # | 1 Comp | 2 Comp | 3 Comp | 4 Comp | 5 Comp | 6 Comp | 7 Comp | 8 Comp |
|---|---|---|---|---|---|---|---|---|
| PP (wt %) | 75 | 71.25 | 71.25 | 71.25 | 71.25 | 50 | 47.5 | 47.5 |
| PA-6 (wt %) | 25 | 23.75 | 23.75 | 23.75 | 23.75 | 50 | 47.5 | 47.5 |
| MA-PP1 (wt %) | 0 | 5 | 0 | 0 | 0 | 0 | 5 | 0 |
| MA-ICP (wt %) | 0 | 0 | 5 | 0 | 0 | 0 | 0 | 5 |
| MA-NPP1 (wt %) | 0 | 0 | 0 | 5 | 0 | 0 | 0 | 0 |
| MA-NPP2 (wt %) | 0 | 0 | 0 | 0 | 5 | 0 | 0 | 0 |
| Tg.Flex.Mod.cond. (MPa) ISO 178 | 1743 | 1836 | 1816 | 1428 | 1259 | 1975 | 2093 | 2072 |
| E-Mod.cond.(MPa) ISO 527 | 1976 | 2077 | 1986 | 1686 | 1428 | 2007 | 2340 | 2300 |
| Stress at yield cond. (MPa) ISO 527 | — | 38.3 | 38 | 31.1 | — | — | 48.7 | 48.1 |
| Elongation cond.(%) ISO 527 | 7 | 35 | 22 | 125 | 138 | 8 | 74 | 71 |
| F(max) (MPa) | 31.5 | — | — | — | 28.8 | 33.4 | — | — |

TABLE 3-continued

| | | | | | | | | |
|---|---|---|---|---|---|---|---|---|
| Izod notched (KJ/m2) cond. ISO 180/4A | 4 | 6 | 6 | 11 | 11 | 6 | 8 | 9 |
| Charpy notched (KJ/m2) cond. ISO 179/2 at Room Temperature | 4 | 3 | 4 | 10 | 11 | 8 | 10 | 11 |
| MFR(235° C./5 Kg) CD | 44 | 13 | 12 | 9 | 9 | 105 | 18 | 17 |

PA-6 forms the matrix phase.
3 Components.
5 wt % Impact Modifier.

| Example # | 9 Comp | 10 Comp | 11 Comp | 12 Comp | 13 Comp | 14 Comp | 15 Comp |
|---|---|---|---|---|---|---|---|
| PP (wt %) | 47.5 | 47.5 | 25 | 24 | 24 | 24 | 24 |
| PA-6 (wt %) | 47.5 | 47.5 | 75 | 71 | 71 | 71 | 71 |
| MA-PP1 (wt %) | 0 | 0 | 0 | 5 | 0 | 0 | 0 |
| MA-ICP (wt %) | 0 | 0 | 0 | 0 | 5 | 0 | 0 |
| MA-NPP1 (wt %) | 5 | 0 | 0 | 0 | 0 | 5 | 0 |
| MA-NPP2 (wt %) | 0 | 5 | 0 | 0 | 0 | 0 | 5 |
| Tg.Flex.Mod.cond. (MPa) ISO 178 | 1788 | 1663 | 2179 | 2171 | 2065 | 1885 | 1779 |
| E-Mod.cond.(MPa) ISO 527 | 2084 | 1859 | 2321 | 2322 | 2276 | 2103 | 2014 |
| Stress at yield cond. (MPa) ISO 527 | 41.6 | — | 47.5 | 52.7 | 51.4 | — | — |
| Elongation cond.(%) ISO 527 | 131 | 194 | 19 | 76 | 128 | 104 | 144 |
| F(max) (MPa) | — | 39.6 | — | — | — | 47.9 | 46.6 |
| Izod notched (KJ/m2) cond. ISO 180/4A | 12 | 11 | 7 | 11 | 16 | 21 | 24 |
| Charpy notched (KJ/m2) cond. ISO 179/2 at Room Temperature | 12 | 11 | 11 | 16 | 20 | 23 | 23 |
| MFR(235° C./5 Kg) CD | 9 | 9 | 104 | 28 | 17 | 19 | 16 |

TABLE 4

3 Component.
10 wt % Impact Modifier.

| Example # | 16 Inv | 17 Inv | 18 Inv | 19 Inv | 20 Inv | 21 Inv | 22 Inv | 23 Inv | 24 Inv | 25 Inv |
|---|---|---|---|---|---|---|---|---|---|---|
| PP (wt %) | 67.5 | 22.5 | 22.5 | 67.5 | 22.5 | 45 | 67.5 | 22.5 | 45 | 67.5 |
| PA-6 (wt %) | 22.5 | 67.5 | 67.5 | 22.5 | 67.5 | 45 | 22.5 | 67.5 | 45 | 22.5 |
| MA-NPP-1 (wt %) | 0 | 10 | 0 | 10 | 10 | 10 | 5 | 5 | 5 | 5 |
| MA-NPP2 (wt %) | 10 | 0 | 10 | 0 | 0 | 0 | 0 | 0 | 0 | 0 |
| NPP (wt %) | 0 | 0 | 0 | 0 | 0 | 0 | 5 | 5 | 5 | 0 |
| MA-g-EP (wt %) | 0 | 0 | 0 | 0 | 0 | 0 | 0 | 0 | 0 | 0 |
| MA-g-PP (wt %) | 0 | 0 | 0 | 0 | 0 | 0 | 0 | 0 | 0 | 0 |
| EP (wt %) | 0 | 0 | 0 | 0 | 0 | 0 | 0 | 0 | 0 | 5 |
| Tg.Flex.Mod.cond.(MPa) ISO 178 | 966 | 1719 | 1501 | 940 | 1563 | 969 | 991 | 1545 | 1366 | 1007 |
| E-Mod.cond.(MPa) ISO 527 | 1043 | 1942 | 1723 | 940 | 1676 | 1012 | 963 | 1619 | 1468 | 1058 |
| Stress at yield cond. (MPa) ISO 527 | — | 45.5 | — | 27.3 | 43.5 | 29.7 | 27.4 | 41.2 | 36.7 | 26 |
| Elongation cond.(%) ISO 527 | 113 | 150 | 196 | 93 | 126 | 152 | 131 | 138 | 120 | 194 |
| F(max) (MPa) | 26.9 | — | 42.6 | — | — | — | — | — | — | — |
| Izod notched (KJ/m2) cond. ISO 180/4A at Room Temperature | 20 | 26 | 75 | 20 | 75 | 12 | 21 | 57 | 17 | 33 |
| Charpy notched (KJ/m2) cond. ISO 179/2 at Room Temperature | 16 | 23 | 42 | 17 | 41 | 15 | 22 | 40 | 18 | 30 |
| MFR(235° C./5 Kg) | 10 | 10 | 8 | 10 | 10 | 4 | 8 | 16 | 8 | 9 |

| Example # | 26 Comp | 27 Comp | 28 Comp | 29 Comp | 30 Comp | 31 Comp | 32 Comp | 33 Comp |
|---|---|---|---|---|---|---|---|---|
| PP (wt %) | 67.5 | 22.5 | 67.5 | 22.5 | 22.5 | 67.5 | 22.5 | 45 |
| PA-6 (wt %) | 22.5 | 67.5 | 22.5 | 67.5 | 67.5 | 22.5 | 67.5 | 45 |
| MA-NPP-1 (wt %) | 0 | 0 | 0 | 0 | 0 | 3 | 3 | 3 |
| MA-NPP2 (wt %) | 0 | 0 | 0 | 0 | 0 | 0 | 0 | 0 |

TABLE 4-continued

| | | | | | | | | |
|---|---|---|---|---|---|---|---|---|
| NPP (wt %) | 0 | 0 | 0 | 0 | 5 | 7 | 7 | 7 |
| MA-g-EP (wt %) | 5 | 5 | 0 | 0 | 0 | 0 | 0 | 0 |
| MA-g-PP (wt %) | 5 | 5 | 5 | 5 | 0 | 0 | 0 | 0 |
| EP (wt %) | 0 | 0 | 5 | 5 | 5 | 0 | 0 | 0 |
| Tg.Flex.Mod.cond.(MPa) ISO 178 | 1393 | 1791 | 1567 | 1883 | 1704 | 1154 | 1562 | 1421 |
| E-Mod.cond.(MPa) ISO 527 | 1529 | 1920 | 1706 | 2000 | 1835 | 1271 | 1692 | 1582 |
| Stress at yield cond. (MPa) ISO 527 | 32.1 | 47.8 | 33 | 47.6 | 41.9 | 29.4 | 40.2 | 38.5 |
| Elongation cond.(%) ISO 527 | 64 | 72 | 70/5 | 71 | 16 | 123 | 94 | 100 |
| F(max) (MPa) | — | — | — | — | — | — | — | — |
| Izod notched (KJ/m2) cond. ISO 180/4A at Room Temperature | 14 | 24 | 14 | 12 | 7 | 16 | 21 | 18.5 |
| Charpy notched (KJ/m2) cond. ISO 179/2 at Room Temperature | 13 | 20 | 10 | 15 | 8 | 18 | 25 | 19 |
| MFR(235° C./5 Kg) | 10 | 13 | 13 | 25 | 84 | 13 | 22 | 15 |

TABLE 5

| Example # | 34 | 35 | 36 | 37 | 38 | 39 | 40 | 41 | 42 |
|---|---|---|---|---|---|---|---|---|---|
| PP (wt %) | 67.5 | 67.5 | 67.5 | 67.5 | 67.5 | 22.5 | 22.5 | 22.5 | 22.5 |
| PA-6 (wt %) | 22.5 | 22.5 | 22.5 | 22.5 | 22.5 | 67.5 | 67.5 | 67.5 | 67.5 |
| MA-NPP2 (wt %) | 5 | 5 | 5 | 5 | 5 | 5 | 5 | 5 | 5 |
| EO1 (wt %) | 5 | 0 | 0 | 0 | 0 | 0 | 0 | 0 | 0 |
| EO2 (wt %) | 0 | 5 | 0 | 0 | 0 | 0 | 0 | 0 | 0 |
| EO3 (wt %) | 0 | 0 | 5 | 0 | 0 | 0 | 0 | 0 | 0 |
| EO4 (wt %) | 0 | 0 | 0 | 5 | 0 | 0 | 0 | 0 | 0 |
| EO5 (wt %) | 0 | 0 | 0 | 0 | 5 | 0 | 0 | 0 | 0 |
| EO6 (wt %) | 0 | 0 | 0 | 0 | 0 | 5 | 0 | 0 | 0 |
| EO7 (wt %) | 0 | 0 | 0 | 0 | 0 | 0 | 5 | 0 | 0 |
| EO8 (wt %) | 0 | 0 | 0 | 0 | 0 | 0 | 0 | 5 | 0 |
| EO9 (wt %) | 0 | 0 | 0 | 0 | 0 | 0 | 0 | 0 | 5 |
| Tg.Flex.Mod.cond. (MPa) ISO 178 | 1101 | 974 | 969 | 985 | 966 | 1468 | 1451 | 1464 | 1468 |
| E-Mod.cond. (MPa) ISO 527 | 1117 | 1045 | 1031 | 1015 | 992 | 1710 | 1698 | 1634 | 1664 |
| Stress at yield cond. (MPa) ISO 527 | 28 | 27 | 27 | 27 | 27 | 42 | 41 | 42 | 42 |
| Elongation cond. (%) ISO 527 | 192 | 183 | 187 | 176 | 204 | 106 | 87 | 99 | 101 |
| Izod notched (KJ/m2) cond. ISO 180/4A | 19 | 26 | 25 | 28 | 32 | 36 | 36 | 38 | 32 |
| MFR (275° C./2.16 Kg), g/10 min | | | | | | 4 | 4 | 4 | 4 |
| MFR (235° C./2.16 Kg), g/10 min | 1.5 | 1.4 | 1.4 | 1.4 | 1.4 | | | | |

Figure 2:
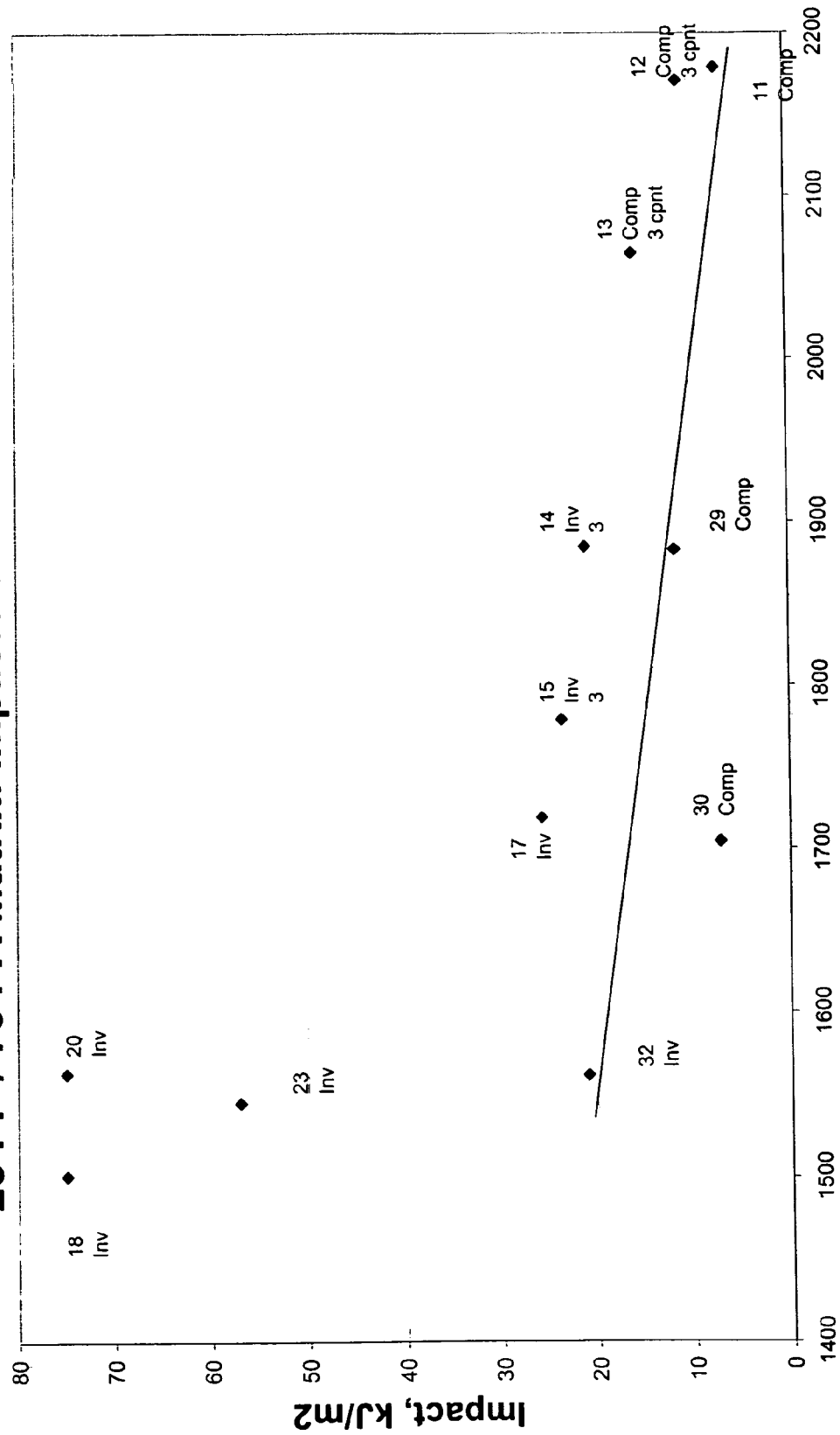

The results in terms of the Izod impact strength and Flexural Modulus for Table 3 and Table 4 are plotted in FIG. 1 and 2. These illustrate that, at equivalent modifier level (10%), this new composition increases impact strength by 60% versus a 50/50 blend of maleic anhydride grafted alpha olefin propylene copolymer and an ungrafted alpha olefin propylene copolymer or versus a 10% maleic anhydride grafted alpha-olefin propylene copolymer while keeping flexural modulus unchanged. Use of EP and EO copolymer as auxiliary impact modifier and more amorphous types to propylene based elastomer appear to be more effective.

Various tradenames used herein are indicated by a ™ symbol, indicating that the names may be protected by certain trademark rights. Some such names may also be registered trademarks in various jurisdictions.

All patents, test procedures, and other documents cited herein are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. When numerical lower limits and numerical upper limits are listed herein, ranges from any lower limit to any upper limit are contemplated.

We claim:

1. A thermoplastic composition comprising:
   (A) an isotactic polypropylene having a melting point of at least 110° C.;
   (B) a polyamide;
   (C) at least 2% by weight, based on the total polymer weight of the thermoplastic composition, of a grafted functionalized propylene-based elastomer having isotactic crystallinity, a heat of fusion of less than 40 J/g, and a melting point of less than 110° C.; and containing at least 0.25% by weight, based on the total weight of the propylene-based elastomer, of maleic anhydride-derived units; and optionally (D) an ungrafted polyolefin having a melting point of less than 100° C.;
wherein the combined wt % of (A) and (B) is at least 70%, based on the total polymer weight of the thermoplastic composition, and the combined wt % of (C) and (D) is at least 8% based on the total polymer weight of the thermoplastic composition.

2. The thermoplastic composition of claim 1, wherein the thermoplastic composition comprises at least 4% by weight of the propylene-based elastomer(C), based on the total polymer weight of the thermoplastic composition; and wherein the combined wt % of (C) and (D) is less than 30%, based on the total polymer weight of the thermoplastic composition.

3. The thermoplastic composition of claim 1, wherein the propylene-based elastomer (C) has crystallinity derived from stereoregularly arranged propylene units.

4. The thermoplastic composition of claim 3, wherein the propylene-based elastomer (C) has crystallinity derived from isotactically arranged propylene units.

5. The thermoplastic composition of claim 1, wherein the propylene-based elastomer (C) contains from 0.1% to 2% by weight, based on the total weight of the propylene-based elastomer, of maleic anhydride-derived units.

6. The thermoplastic composition of claim 1, wherein the propylene-based elastomer (C) contains from 0.5% to 1.5% by weight, based on the total weight of the propylene-based elastomer, of maleic anhydride-derived units.

7. The thermoplastic composition of claim 1, wherein the propylene-based elastomer (C) contains from 5 to 40 mol % of ethylene-derived units and has a heat of fusion of from 5 to 30 J/g.

8. The thermoplastic composition of claim 1, wherein the propylene-based elastomer (C) contains from 12.5 to 25 mol % ethylene-derived units.

9. The thermoplastic composition of claim 1, wherein the ungrafted polyolefin (D) is an ethylene alpha-olefin copolymer having a density of from 0.85 to 0.89 g/cc.

10. The thermoplastic composition of claim 9, wherein the ethylene alpha-olefin copolymer contains from 45 to 65 wt % ethylene-derived units.

11. The thermoplastic composition of claim 1, wherein the ungrafted polyolefin (D) is an ethylene propylene copolymer containing from 45 to 65 wt % ethylene-derived units, based on the total weight of the copolymer.

12. The thermoplastic composition of claim 11, wherein the ungrafted polyolefin (D) is used in an amount of from 60% to 20% by weight, based on the total combined weight of(C) and (D).

13. The thermoplastic composition of claim 1, wherein the ungrafted polyolefin (D) is a propylene-based elastomer having isotactic crystallinity and containing a comonomer in an amount within 10 mol % of the amount of comonomer present in (C).

14. The thermoplastic composition of claim 13, wherein the comonomer of the ungrafted polyolefin (D) is ethylene and the comonomer of(C) is ethylene.

15. The thermoplastic composition of claim 1, wherein the isotactic polypropylene (A) is selected from the group consisting of a polypropylene homopolymer, and a polypropylene random copolymer containing less than 10 wt % of crystallinity-disrupting comonomer.

16. The thermoplastic composition of claim 1, wherein the polyamide (B) is selected from the group consisting of nylon 6, nylon 12, and nylon 6,6.

17. The thermoplastic composition of claim 15, wherein the polyamide (B) is selected from the group consisting of nylon 6, nylon 12, and nylon 6,6.

18. A molded article made from the thermoplastic composition of claim 1.

19. An extruded article made from the thermoplastic composition of claim 1.

20. A thermoplastic composition comprising:
(A) at least 60% by weight, based on the total polymer weight of the thermoplastic composition, of an isotactic polypropylene having a melting point of at least 100° C.;
(B) at least 10 by weight, based on the total polymer weight of the thermoplastic composition, of a polyamide;
(C) at least 2% by weight, based on the total polymer weight of the thermoplastic composition, of a grafted functionalized propylene-based elastomer having isotactic crystallinity and containing at least 0.25% by weight, based on the total weight of the propylene-based elastomer, of maleic anhydride-derived units; and optionally
(D) an ungrafted polyolefin having a melting point of less than 100° C.;
wherein the combined wt % of (C) and (D) is at least 8% by weight, based on the total polymer weight of the thermoplastic composition; the thermoplastic composition has a matrix formed by the isotactic polypropylene (A); and the thermoplastic composition has a Flexural modulus of from 800 to 1600 MPa.

21. The thermoplastic composition of claim 20, wherein the thermoplastic composition has a Flexural modulus of from 900 to 1200 MPa.

22. The thermoplastic composition of claim 20, wherein the thermoplastic composition comprises at least 4% by weight, based on the total polymer weight of the thermoplastic composition, of the grafted functionalized propylene-based elastomer (C), and wherein the combined wt % of (C) and (D) is less than 30%.

23. The thermoplastic composition of claim 20, wherein the thermoplastic composition has a ratio
[Izod Impact J/m$^2$]/[Flexural Modulus in MPa] conforming to the relationship:

12<[Izod Impact J/m$^2$]) /[Flexural Modulus in MPa]×1000<50.

24. The thermoplastic composition of claim 20, wherein the thermoplastic composition has a ratio
[Izod Impact J/m$^2$]/[Flexural Modulus in MPa] conforming to the relationship:

15<[Izod Impact J/m$^2$]/ [Flexural Modulus in MPa]×1000<45.

25. The thermoplastic composition of claim 20, wherein the propylene-based elastomer (C) has crystallinity derived from stereoregularly arranged propylene units, a heat of fusion of less than 40 J/g, and a melting point of less than 110° C.

26. The thermoplastic composition of claim 25, wherein the propylene-based elastomer (C) has crystallinity derived from isotactically arranged propylene units.

27. The thermoplastic composition of claim 20, wherein the propylene-based elastomer (C) contains from 0.1% to 2% by weight, based on the total weight of the propylene-based elastomer, of maleic anhydride-derived units.

28. The thermoplastic composition of claim 20, wherein the propylene-based elastomer (C) contains from 0.5% to 1.5% by weight, based on the total weight of the propylene-based elastomer, of maleic anhydride-derived units.

29. The thermoplastic composition of claim 20, wherein the propylene-based elastomer (C) contains from 5 to 40 mol % of ethylene-derived units and has a heat of fusion of from 5 to 30 J/g.

30. The thermoplastic composition of claim 20, wherein the propylene-based elastomer (C) contains from 12.5 to 25 mol % of ethylene-derived units.

31. The thermoplastic composition of claim 20, wherein the ungrafted polyolefin (D) is an ethylene alpha-olefin copolymer having a density of from 0.85 to 0.89 g/cc.

32. The thermoplastic composition of claim 31, wherein the ethylene alpha-olefin copolymer contains from 45 to 65 wt % ethylene-derived units.

33. The thermoplastic composition of claim 20, wherein the ungrafted polyolefin (D) is an ethylene propylene copolymer containing from 45 to 65 wt % ethylene-derived units.

34. The thermoplastic composition of claim 33, wherein the ungrafted polyolefin (D) is used in an amount of from 60% to 20% by weight, based on the total combined weight of (C) and (D).

35. The thermoplastic composition of claim 20, wherein the ungrafted polyolefin (D) is a propylene-based elastomer having isotactic crystallinity and containing a comonomer in an amount within 10 mol % of the amount of comonomer present in (C).

36. The thermoplastic composition of claim 35, wherein the comonomer of the ungrafted polyolefin (D) is ethylene and the comonomer of (C) is ethylene.

37. The thermoplastic composition of claim 20, wherein the isotactic polypropylene (A) is selected from the group consisting of a polypropylene homopolymer, and a polypropylene random copolymer containing less than 10 wt % of crystallinity-disrupting comonomer.

38. The thermoplastic composition of claim 20, wherein the polyamide (B) is selected from the group consisting of nylon 6, nylon 12, and nylon 6,6.

39. The thermoplastic composition of claim 37, wherein the polyamide (B) is selected from the group consisting of nylon 6, nylon 12, and nylon 6,6.

40. A molded article made from the thermoplastic composition of claim 20.

41. An extruded article made from the thermoplastic composition of claim 20.

42. A thermoplastic composition comprising;
(A) at least 10% by weight, based on the total polymer weight of the thermoplastic composition, of an isotactic polypropylene having a melting point of at least 110° C.;
(B) at least 60% by weight, based on the total polymer weight of the thermoplastic composition, of a polyamide;
(C) at least 2% by weight, based on the total polymer weight of the thermoplastic composition, of a grafted functionalized propylene-based elastomer having isotactic crystallinity and containing at least 0.25% by weight, based on the total weight of the propylene-based elastomer, of maleic anhydride-derived units; and optionally
(D) an ungrafted polyolefin having a melting point of less than 100° C.;
wherein the combined wt % of (C) and (D) is at least 8% by weight, based on the total polymer weight of the thermoplastic composition; the thermoplastic composition has a matrix formed by the polyamide (B); and the thermoplastic composition has a Flexural modulus of from 1200 to 2000 MPa.

43. The thermoplastic composition of claim 42, wherein the thermoplastic composition has a Flexural modulus of from 1400 to 1800 MPa.

44. The thermoplastic composition of claim 42, wherein the thermoplastic composition comprises at least 4% by weight, based on the total polymer weight of the thermoplastic composition, of the grafted functionalized propylene-based elastomer (C), and wherein the combined wt % of (C) and (D) is less than 30%.

45. The thermoplastic composition of claim 42, wherein the thermoplastic composition has a ratio
[Izod Impact J/m$^2$]/[Flexural Modulus in MPa] conforming to the relationship:

$14 < $[Izod Impact J/m$^2$]/[Flexural Modulus in MPa]$\times 1000 < 80$.

46. The thermoplastic composition of claim 42, wherein the thermoplastic composition has a ratio
[Izod Impact J/m$^2$]/[Flexural Modulus in MPa] conforming to the relationship:

$18 < $[Izod Impact J/m$^2$]/[Flexural Modulus in MPa]$\times 1000 < 60$.

47. The thermoplastic composition of claim 42, wherein the propylene-based elastomer (C) has crystallinity derived from stereoregularly arranged propylene units, a heat of fusion of less than 40 J/g, and a melting point of less than 110° C.

48. The thermoplastic corn position of claim 47, wherein the propylene-based elastomer (C) has crystallinity derived from isotactically arranged propylene units.

49. The thermoplastic composition of claim 42, wherein the propylene-based elastomer (C) contains from 0.1% to 2% by weight, based on the total weight of the propylene-based elastomer, of maleic anhydride-derived units.

50. The thermoplastic composition of claim 42, wherein the propylene-based elastomer (C) contains from 0.1% to 1.5% by weight, based on the total weight of the propylene-based elastomer, of maleic anhydride-derived units.

51. The thermoplastic composition of claim 42, wherein the propylene-based elastomer (C) contains from 0.5% to 1.5% by weight, based on the total weight of the propylene-based elastomer, of maleic anhydride-derived units.

52. The thermoplastic composition of claim 42, wherein the propylene-based elastomer (C) contains from 5 to 40 mol % of ethylene-derived units and has a heat of fusion of from 5 to 30 J/g.

53. The thermoplastic composition of claim 42, wherein the propylene-based elastomer (C) contains from 12.5 to 25 mol % of ethylene-derived units.

54. The thermoplastic composition of claim 42, wherein the ungrafted polyolefin (D) is an ethylene alpha-olefin copolymer having a density of from 0.85 to 0.89 g/cc.

55. The thermoplastic composition of claim 54, wherein the ethylene alpha-olefin copolymer contains from 45 to 65 wt % ethylene-derived units.

56. The thermoplastic composition of claim 42, wherein the ungrafted polyolefin (D) is an ethylene propylene copolymer containing from 45 to 65 wt % ethylene-derived units.

57. The thermoplastic composition of claim 56, wherein the ungrafted polyolefin (D) is used in an amount of from 60% to 20% by weight, based on the total combined weight of (C) and (D).

58. The thermoplastic composition of claim 42, wherein the ungrafted polyolefin (D) is a propylene-based elastomer having isotactic crystallinity and containing a comonomer in an amount within 10 mol % of the amount of comonomer present in (C).

59. The thermoplastic composition of claim 58, wherein the comonomer of the ungrafted polyolefin (D) is ethylene and the comonomer of (C) is ethylene.

60. The thermoplastic composition of claim 42, wherein the isotactic polypropylene (A) is selected from the group consisting of a polypropylene homopolymer, and a polypropylene random copolymer containing less than 10 wt % of crystallinity-disrupting comonomer.

61. The thermoplastic composition of claim 42, wherein the polyamide (B) is selected from the group consisting of nylon 6, nylon 12, and nylon 6,6.

62. The thermoplastic composition of claim 60, wherein the polyamide (B) is selected from the group consisting of nylon 6, nylon 12, and nylon 6,6.

63. A molded article made from the thermoplastic composition of claim 42.

64. An extruded article made from the thermoplastic composition of claim 42.

* * * * *